(12) United States Patent
Kohara et al.

(10) Patent No.: US 10,845,583 B2
(45) Date of Patent: Nov. 24, 2020

(54) SCANNING MICROSCOPE

(71) Applicant: CANON KABUSHIKI KAISHA, Tokyo (JP)

(72) Inventors: Naoki Kohara, Kawasaki (JP); Akira Yamamoto, Ageo (JP)

(73) Assignee: Canon Kabushiki Kaisha, Tokyo (JP)

( * ) Notice: Subject to any disclaimer, the term of this patent is extended or adjusted under 35 U.S.C. 154(b) by 108 days.

(21) Appl. No.: 15/363,494

(22) Filed: Nov. 29, 2016

(65) Prior Publication Data

US 2017/0153432 A1 Jun. 1, 2017

(30) Foreign Application Priority Data

Dec. 1, 2015 (JP) ................. 2015-235241

(51) Int. Cl.
*G02B 21/00* (2006.01)
(52) U.S. Cl.
CPC ..... *G02B 21/0032* (2013.01); *G02B 21/0052* (2013.01); *G02B 21/0056* (2013.01); *G02B 21/0064* (2013.01); *G02B 21/0076* (2013.01)

(58) Field of Classification Search
None
See application file for complete search history.

(56) References Cited

U.S. PATENT DOCUMENTS 6,064,518 A  5/2000  Stelzer et al.
7,257,289 B2 * 8/2007  Olschewski .......... G01J 3/2823
                                                250/458.1
2005/0099673 A1 * 5/2005  Birk .................... G02B 21/0024
                                                359/305
2006/0238745 A1 10/2006 Hashimoto
(Continued)

FOREIGN PATENT DOCUMENTS

JP   2002-090638 A   3/2002
JP   2002-156715 A   5/2002
(Continued)

OTHER PUBLICATIONS

Christian W. Freudiger, Wei Min, Brian G. Saar, Sijia Lu, Gary R. Holtom, Chengwei He, Jason C. Tsai, Jing X. Kang, X. Sunney Xie, Label-Free Biomedical Imaging with High Sensitivity by Stimulated Raman Scattering Microscopy, Science, Dec. 19, 2008, 322(5909):1857-1861, American Association for the Advancement of Science, Washington DC, 2008.

*Primary Examiner* — Derek S. Chapel
(74) *Attorney, Agent, or Firm* — Canon U.S.A., Inc. I.P. Division

(57) ABSTRACT

A scanning microscope includes a scanning unit that causes irradiation light emitted by a light source to scan a sample, an optical system that guides the emitted light that has passed through the scanning unit to the sample, an isolation unit that includes a transmissive portion that enables the irradiation light to pass the transmissive portion and a reflective portion that reflects at least some of light that is included in emitted light generated from the sample as a result of the irradiation light being radiated to the sample and that has passed through the optical system and the scanning unit, and a detection unit that detects the emitted light that has passed through the isolation unit. The isolation unit is disposed in an optical path of the irradiation light between the light source and the scanning unit.

18 Claims, 3 Drawing Sheets

(56) References Cited

U.S. PATENT DOCUMENTS

| | | | | |
|---|---|---|---|---|
| 2007/0205378 A1* | 9/2007 | Tomioka | ............ | G02B 21/0064 |
| | | | | 250/458.1 |
| 2008/0068710 A1* | 3/2008 | Wolleschensky | .... | G02B 21/002 |
| | | | | 359/389 |
| 2014/0104681 A1* | 4/2014 | Berman | ............. | G02B 21/0032 |
| | | | | 359/385 |
| 2014/0210983 A1* | 7/2014 | Shimura | ............ | G02B 21/0016 |
| | | | | 348/80 |
| 2017/0199362 A1* | 7/2017 | Schwedt | ............ | G02B 21/0032 |
| 2017/0235119 A1* | 8/2017 | Fujii | ................. | G02B 21/0032 |
| | | | | 348/79 |

FOREIGN PATENT DOCUMENTS

| | | | |
|---|---|---|---|
| JP | 2006-022387 A | | 1/2006 |
| JP | 2006-030992 A | | 2/2006 |
| JP | 2010-139465 A | | 6/2010 |
| JP | 2015-007620 A | | 1/2015 |
| WO | 2014057893 A1 | | 4/2014 |

* cited by examiner

SCANNING MICROSCOPE

BACKGROUND

Field of Art

The present disclosure relates to a scanning microscope.

Description of the Related Art

A scanning microscope that condenses irradiation light onto a focal point (spot) and causes the spot to scan a sample by using a resonant scanner or a galvanometer scanner has been used for detecting fluorescent light and Raman scattered light generated as a result of light being radiated onto a sample. When evaluating a thick sample having a low light transmittance, a reflection microscope that detects, scattered light, which has been multiply-scattered in the sample, or fluorescent light as emitted light through an objective lens used for radiation of light is used.

In particular, in a scanning microscope that uses a non-linear optical process, information contained in scattered light, which has been multiply-scattered in a sample, or fluorescent light is considered to be generated at a spot due to its non-linearity with respect to the intensity of light radiated to the sample. Thus, by causing a spot to two-dimensionally or three-dimensionally scan the inside of a sample, two-dimensional or three-dimensional information corresponding to the sample can be obtained. Examples of the non-linear optical process include multiphoton excited fluorescence, second harmonic generation, coherent anti-stokes Raman scattering, and stimulated Raman scattering.

In the case of a reflection microscope, among scattered light obtained as a result of irradiation light being multiply-scattered in a sample, some of the scattered light that has been emitted within the field of view of an objective lens and within the numerical aperture of the objective lens is detected. Since the intensity of the obtained emitted light is smaller than that of the irradiation light, it is necessary to detect the emitted light by efficiently isolating the emitted light from the irradiation light whose optical path matches or is close to the optical path of the emitted light.

As a method of isolating emitted light from irradiation light, U.S. Patent Application Publication No. 2006/0238745 (Patent Document 1) describes that, emitted light generated as a result of coherent anti-stokes Raman scattering may be isolated from irradiation light on the basis of a difference in wavelength between the emitted light and the irradiation light by using a dichroic mirror that enables only light having a specific wavelength to pass therethrough.

In addition, Science, Vol. 322, pp. 1857-1861, 2008 (Non-Patent Document 1) describes a microscope capable of observing stimulated Raman scattering (SRS) by causing a tunable optical parametric oscillator and a mode-locked Nd:YVO4 oscillator to be synchronized with each other so as to converge these light beams onto a sample while being coaxial with each other. In Non-Patent Document 1, light that has been emitted from a sample and that has passed through an objective lens, which guides irradiation light to the sample, is isolated from the optical path of the irradiation light by using a λ/4 plate and a polarizing beam splitter (PBS) and is transmitted to a detector.

SUMMARY

A scanning microscope according to an aspect of the present invention includes a scanning unit that causes irradiation light emitted by a light source to scan a sample, an optical system that guides the emitted light that has passed through the scanning unit to the sample, an isolation unit that includes a transmissive portion that enables the irradiation light to pass the transmissive portion and a reflective portion that reflects at least some of light that is included in emitted light generated from the sample as a result of the irradiation light being radiated to the sample and that has passed through the optical system and the scanning unit, and a detection unit that detects the emitted light that has passed through the isolation unit. The isolation unit is disposed in an optical path of the irradiation light between the light source and the scanning unit.

Further features of the present invention will become apparent from the following description of exemplary embodiments with reference to the attached drawings.

DESCRIPTION OF THE EMBODIMENTS

The method described in Patent Document 1, however, cannot be used in detection of stimulated Raman scattered light such as that described in Non-Patent Document 1. This is because, since light having a wavelength the same as that of irradiation light is detected in order to measure stimulated Raman scattering, the optical path of the irradiation light and the optical path of emitted light cannot be isolated from each other even if a dichroic mirror is used.

In addition, since multiply-scattered light has been depolarized, in a configuration such as that described in Non-Patent Document 1 in which a PBS is used, approximately half of emitted light is isolated from irradiation light and guided to a detector. That is to say, using the method described in Non-Patent Document 1 limits the efficiency with which light emitted from a sample is obtained.

An aspect of the present invention has been made in view of the above problems and may be directed at providing a scanning microscope capable of obtaining, with higher efficiency than in the related art, light that is generated as a result of light being radiated to a sample and that is emitted from the sample.

First Embodiment

Figure 1:
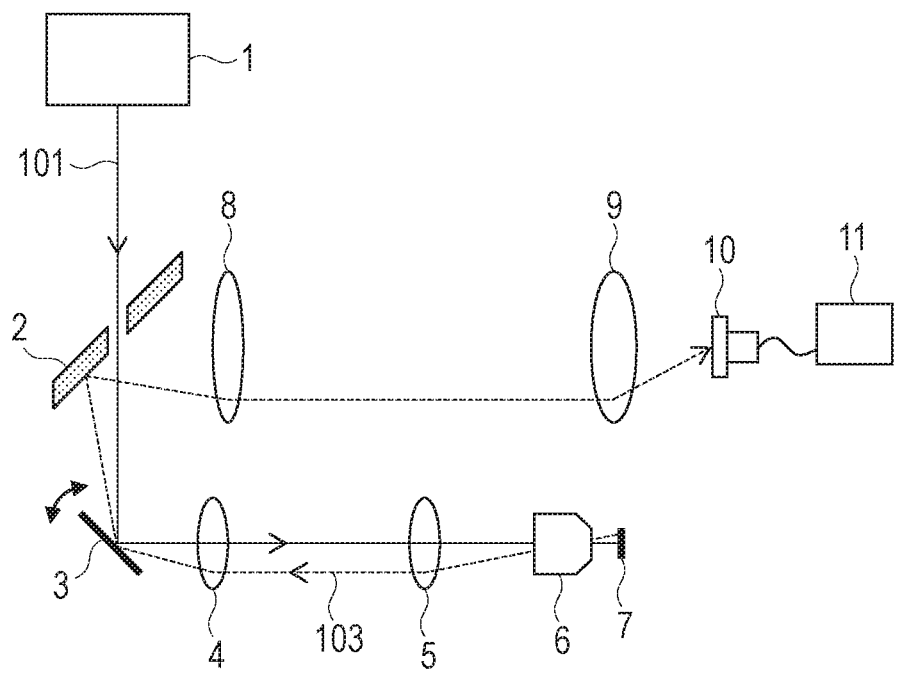
FIG. 1 is a schematic diagram illustrating the configuration of a scanning microscope according to a first embodiment of the present invention.

The configuration of a scanning microscope 100 (hereinafter referred to as microscope 100) according to a first embodiment of the present invention will now be described with reference to FIG. 1. FIG. 1 is a schematic diagram illustrating the configuration of the microscope 100. The microscope 100 is a scanning microscope that includes one light source and is, for example, a multiphoton excited fluorescence microscope, a second harmonic generation microscope, or the like. The microscope 100 accord to the first embodiment condenses light output by a light source 1 onto a focal point (spot) and detects the intensity of light emitted from a sample 7 while causing the light to two-dimensionally scan the inside of the sample 7 (as well as a surface of the sample 7) so as to obtain an image of the sample 7. Note that, in the following description, a pencil of light rays radiated onto the sample 7 by the light source 1 will be referred to as an irradiation light beam, and light emitted from the sample 7 after the irradiation light beam has been radiated to the sample 7 will be referred to as emitted light. The emitted light is light that is multiply-scattered in the sample 7 and then emitted from the sample 7, and backscattered light and the like are included in the emitted light.

The microscope 100 includes the light source 1, an isolation unit 2, a scanning unit 3, lenses 4 and 5, an optical system 6, lenses 8 and 9, and a detection unit (detector) 10.

The light source 1 outputs an irradiation light beam 101 that is radiated onto the sample 7. The irradiation light beam 101 output by the light source 1 is a collimated beam. The irradiation light beam 101 emitted by the light source 1 is incident on the isolation unit 2.

The isolation unit 2 enables the irradiation light beam 101 emitted by the light source 1 to pass therethrough and reflects the emitted light emitted from the sample 7 so as to isolate the optical path of the irradiation light beam 101 emitted by the light source 1 and the optical path of the emitted light emitted from the sample 7 from each other. Details of the isolation unit 2 will be described later.

The irradiation light beam 101 that has passed through the isolation unit 2 is reflected by the scanning unit 3. The scanning unit 3 is disposed in the optical path of the irradiation light beam 101 between the light source 1 and the optical system 6. The scanning unit 3 is configured to cause the irradiation light beam 101 to scan the sample 7 by changing the position of the spot of the irradiation light beam 101 in the sample 7. The scanning unit 3 includes a light deflecting element that changes (deflects) the direction of the irradiation light beam 101 emitted from the scanning unit 3 and changes the angle of incidence of the irradiation light beam 101 with respect to the optical system 6. For example, the scanning unit 3 includes a galvanometer scanner and a resonant scanner and causes the irradiation light beam 101, which has traveled in one direction, to travel in two directions that are perpendicular to each other. Note that the configuration of the scanning unit 3 is not limited to the above-described configuration, and the scanning unit 3 may be combined with a resonant mirror or a polygonal mirror for high-speed scanning or may include one mirror, such as a MEMS scanner, instead of two mirrors.

The irradiation light beam 101 that has been deflected by the scanning unit 3 is incident on the optical system 6 via the lenses 4 and 5. The lenses 4 and 5 are disposed in such a manner that the scanning unit 3 and the entrance pupil of the optical system 6 are conjugated with each other. By causing the scanning unit 3 and the entrance pupil of the optical system 6 to be conjugated with each other, the irradiation light beam 101 is condensed onto the sample 7 without being blocked by the optical system 6, which in turn results in a change in the intensity of the irradiation light beam 101.

Note that the wording "the scanning unit 3 and the entrance pupil of the optical system 6 are conjugated with each other" described herein refers to the state where the scanning unit 3 and the entrance pupil of the optical system 6 are substantially conjugated with each other as well as the state where the scanning unit 3 and the entrance pupil of the optical system 6 are completely conjugated with each other. For example, in the case where the scanning unit 3 includes two mirrors, a state where a position that is conjugated with the entrance pupil of the optical system 6 is located between the two mirrors (e.g., a position on one of the two mirrors or an intermediate position between the two mirrors) is included in the wording "the scanning unit 3 and the entrance pupil of the optical system 6 are conjugated with each other".

The magnification of the optical system 6 that is set by the lenses 4 and 5 is selected in such a manner that the entrance pupil of the optical system 6 and the beam size of the irradiation light beam 101 that is incident on the optical system 6 are equal to each other. In this case, the spot size of the irradiation light beam 101 condensed by the optical system 6 can be minimized, and the spatial resolution of an image to be obtained, the image representing the intensity of scattered light can be improved.

The optical system 6 is an optical system that guides the irradiation light beam 101 to the spot in the sample 7 and that receives the emitted light, which is emitted from the sample 7 toward the optical system 6, so as to guide the emitted light to the scanning unit 3. Although an objective lens is used in the first embodiment, the optical system 6 is not limited to this configuration and may include a mirror. The irradiation light beam 101, which has been condensed in the sample 7, multiply-scattered in the sample 7 and is emitted from the sample 7. The emitted light emitted from the sample 7 is incident on the optical system 6 again and is guided to the scanning unit 3.

The emitted light emitted from the sample 7 reaches the isolation unit 2 via the scanning unit 3. Among the emitted light emitted from the sample 7, the emitted light emitted at a position that is different from the position of the spot of the irradiation light beam 101 in the sample 7 is reflected by the isolation unit 2. As described above, by using the isolation unit 2, the optical path of the irradiation light beam 101 and the optical path of the emitted light can be isolated from each other.

Figure 2:
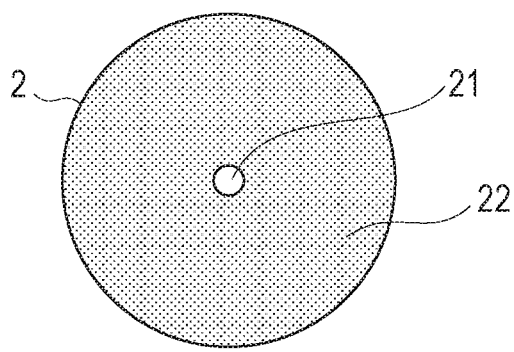
FIG. 2 is a schematic diagram illustrating the configuration of an optical-path isolation unit of the scanning microscope according to the first embodiment.

The configuration of the isolation unit 2 will now be described with reference to FIG. 2. FIG. 2 is a schematic diagram illustrating the configuration of the isolation unit 2. The isolation unit 2 according to the first embodiment includes, in a center portion thereof, a transmission region (transmissive portion) 21 through which the irradiation light beam 101 passes. In addition, the isolation unit 2 includes, around the periphery of the transmissive portion 21, a reflection region (reflective portion) 22 that reflects the emitted light emitted from the sample 7. The reflective portion 22 includes a reflecting mirror, which reflects light. A metal deposited film or a dielectric multilayer film that is designed so as to have high reflectivity at the wavelength of the emitted light is formed as the reflective portion 22 in order to efficiently detect the emitted light. The transmissive portion 21 may be a hole (opening) or the like that is physically formed in the reflecting mirror or may be formed by not providing a reflecting member at a portion of a flat plate. In the latter case, the transmissive portion 21 may be provided with an anti-reflection coating film that causes the transmissive portion 21 to have a high light transmittance for the irradiation light beam 101.

In the case where the irradiation light beam 101 is polarized, the transmissive portion 21 may be formed of a polarizing element that enables the polarized irradiation light beam 101 to pass therethrough and reflects light polarized perpendicularly to the polarized irradiation light beam 101. In this case, in addition to the reflective portion 22, the transmissive portion 21 can also reflect some of the emitted light, and thus, the emitted light can be further efficiently detected. Note that, although the external shape of the isolation unit 2 and the shape of the transmissive portion 21 are circular in FIG. 2, the external shape of the isolation unit 2 and the shape of the transmissive portion 21 may be any shape as long as the emitted light spreading in an arbitrary region can be reflected. For example, the external shape of the isolation unit 2 and the shape of the transmissive portion 21 may each be elliptical or the like having a long axis extending in a direction in which the emitted light is reflected.

When the irradiation light beam 101 travels in a direction normal to a plane, the size of the transmissive portion 21 in the plane is set to be equal to or larger than the beam diameter of the irradiation light beam 101. In the case where this condition is not satisfied, there is a possibility that the irradiation light beam 101 will not completely pass through the isolation unit 2, so that the light intensity of the irradiation light beam 101 will be reduced. In addition, in the case where the irradiation light beam 101 is radiated onto the sample 7 while some of the irradiation light beam 101 does not pass through the isolation unit 2, the spot of the irradiation light beam 101 condensed onto the sample 7 becomes larger, and consequently, there is a possibility that the spatial resolution of an image obtained by the microscope 100 will be less than ideal.

Regarding the optical path of the emitted light in the isolation unit 2, the optical path of an emitted light beam 103, which is one of a plurality of light beams included in the emitted light, which is incident on the optical system 6 again from various positions in the sample 7, will now be described as an example.

Since the emitted light beam 103 is emitted at a position that is different from the position of the spot in the sample 7, the emitted light beam 103 is emitted, at an angle that is different from the angle of incidence of the irradiation light beam 101, at the position of the entrance pupil of the optical system 6. Since the position of the entrance pupil of the optical system 6 and the scanning unit 3 are conjugated with each other, the emitted light beam 103 is emitted from the scanning unit 3 at an angle different from the angle of incidence of the irradiation light beam 101. Thus, the emitted light beam 103 is reflected by the reflective portion 22 of the isolation unit 2, which disposed in such a manner as to be spaced apart from the scanning unit 3. The emitted light beam 103, which has been reflected by the reflective portion 22, is incident on the detector 10 via the lenses 8 and 9.

As describe above, a light beam that is emitted at a position in the sample 7, the position being different from the position of the spot of the irradiation light beam 101 in the sample 7, reaches the isolation unit 2 via the optical system 6 and the scanning unit 3 and is reflected by the isolation unit 2. In other words, the isolation unit 2 according to the first embodiment is configured to reflect an emitted light beam emitted at a position different from the position of the spot of the irradiation light beam 101 in the sample 7 so as to isolate the optical path of the irradiation light beam 101 and the optical path of the emitted light beam from each other. Thus, the isolation unit 2 is disposed at a position that does not have a Fourier transform relationship with the image plane of the optical system 6. That is to say, the isolation unit 2 is disposed at a position that is not conjugated with the entrance pupil of the optical system 6. In addition, the isolation unit 2 needs to be positioned between the light source 1 and the scanning unit 3. This is because, in the case where the isolation unit 2 is disposed between the scanning unit 3 and the optical system 6, when the direction of the irradiation light beam 101 is changed by the scanning unit 3, the irradiation light beam 101 cannot pass through the transmissive portion 21.

The emitted light generated in the vicinity of the spot of the irradiation light beam 101, is more likely to be reflected by the reflective portion 22 as the position of the isolation unit 2 is farther from the scanning unit 3. On the other hand, the farther from the scanning unit 3 the isolation unit 2 is positioned, the larger the reflective portion 22 needs to be formed in order to reflect the emitted light gene rated in a region in the sample 7. Therefore, in order to increase the efficiency with which the emitted light is obtained, the isolation unit 2 may be disposed at a position far from the scanning unit 3, and the external size of the isolation unit 2 may be set to be large so as to be proportional to the distance between the isolation unit and the scanning unit 3.

The detector 10 has sensitivity to the emitted light including the emitted light beam 103 and is a detection unit that outputs a voltage corresponding to the intensity of light that is incident thereon. Here, the detector 10 detects the emitted light emitted from the sample 7. It is desirable that the scanning unit 3 and the detector 10 be arranged in such a manner that the scanning unit 3 and a light-receiving surface of the detector 10 are conjugated with each other. By arranging the scanning unit 3 and the detector 10 in such a manner that the scanning unit 3 and the light-receiving surface of the detector 10 are conjugated with each other, the position of the emitted light that is radiated onto the light-receiving surface of the detector 10 becomes constant regardless of the angle at which the scanning unit 3 deflects light. Therefore, the probability of the emitted light being radiated onto a region outside the light-receiving surface can be reduced, and detection of the emitted light can be performed while the influence of unevenness in the light-receiving sensitivity in the light-receiving surface is reduced.

Note that the wording "the scanning unit 3 and the light-receiving surface of the detector 10 are conjugated with each other" refers to the state where the scanning unit 3 and the light-receiving surface of the detector 10 are substantially conjugated with each other as well as the state where the scanning unit 3 and the light-receiving surface of the detector 10 are completely conjugated with each other. For example, in the case where the scanning unit 3 includes two mirrors, a state where a position that is conjugated with the light-receiving surface (detection surface) of the detector 10 is located between the two mirrors (e.g., a position on one of the two mirrors or an intermediate position between the two mirrors) is included in the wording "the scanning unit 3 and the light-receiving surface of the detector 10 are conjugated with each other".

A computer 11 acquires two-dimensional image data by using a control signal of the scanning unit 3 and a signal output by the detector 10. More specifically, the computer 11 can acquire two-dimensional image data representing the intensity of the emitted light. The two-dimensional image data, which is obtained, is displayed as an image by a display section (not illustrated).

As described above, in the microscope 100, the isolation unit 2 is disposed in the optical path of the irradiation light beam 101 between the light source 1 and the scanning unit 3. When the irradiation light beam 101 is radiated onto the sample 7, scattered light, fluorescent light, harmonic generation light, and the like generated in the sample 7 are multiply-scattered and are emitted from the sample 7 as the emitted light. Since the isolation unit 2 is configured to enable the irradiation light beam 101 to pass therethrough and reflect the emitted by using the isolation unit 2, the optical path of the irradiation light beam 101 and the optical path of the emitted light can be isolated from each other, and the emitted light can be obtained. Since the isolation unit 2 isolates the optical paths from each other without using a dichroic mirror, the emitted light having a wavelength the same as the wavelength of the irradiation light beam 101, as well as fluorescent light and harmonic generation light, can be detected. In addition, a larger portion of the emitted light, which has reached the isolation unit 2, can be guided to the detector 10 compared with the configuration in which the optical paths are isolated from each other by polarization. Therefore, according to the microscope 100 of the first embodiment, the emitted light emitted from the sample 7 can be detected with higher efficiency than in the related art.

Second Embodiment

Figure 3:
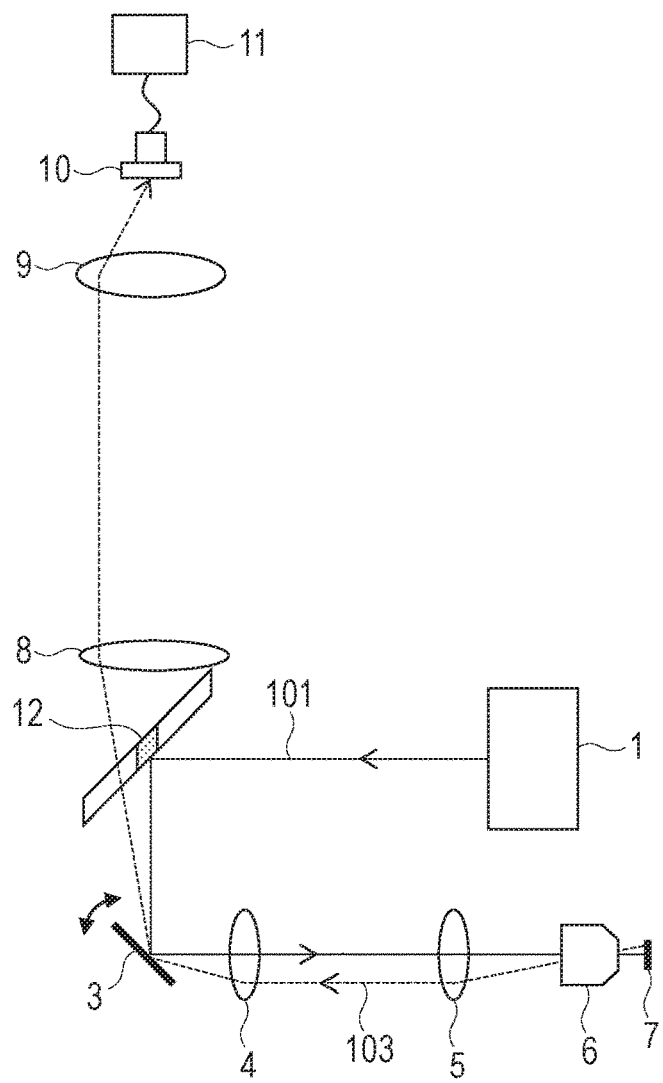
FIG. 3 is a schematic diagram illustrating the configuration of a scanning microscope according to a second embodiment.

A scanning microscope 300 (hereinafter referred to as microscope 300) according to a second embodiment will now be described with reference to FIG. 3. FIG. 3 is a schematic diagram illustrating the configuration of the microscope 300. In the microscope 300 according to the second embodiment, the configuration of an isolation unit 12 that isolates the emitted light emitted from the sample 7 and the irradiation light beam 101 from each other is different from that of the isolation unit 2 according to the first embodiment. More specifically, the isolation unit 12 according to the second embodiment obtains the emitted light by reflecting the irradiation light beam 101 and enabling the emitted light to pass therethrough whereas the isolation unit 2 according to the first embodiment obtains the emitted light by reflecting the emitted light. The rest of the configuration of the microscope 300 is similar to that of the microscope 100 according to the first embodiment. In FIG. 3, components similar to those in the first embodiment are denoted by the same reference numerals, and detailed descriptions thereof will be omitted.

Figure 4:
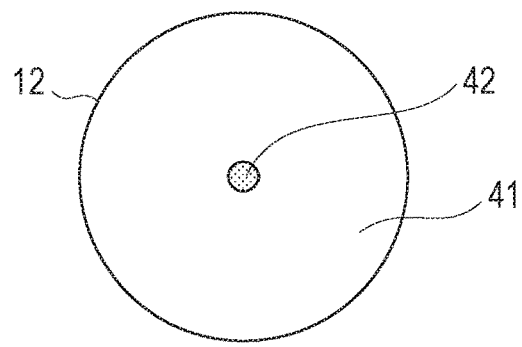
FIG. 4 is a schematic diagram illustrating the configuration of an optical-path isolation unit of the scanning microscope according to the second embodiment.

FIG. 4 is a schematic diagram illustrating the configuration of the isolation unit 12. The isolation unit 12 includes, in a center portion thereof, a reflection region (reflective portion) 42 that reflects the irradiation light beam 101. In addition, the isolation unit 12 includes, around the outer periphery of the reflective portion 42, a transmission region (transmissive portion) 41 through which the emitted light emitted from the sample 7 passes. The irradiation light beam 101 emitted by the light source 1 is reflected by the isolation unit 12 and guided to the scanning unit 3. The emitted light emitted from the sample 7, which includes the emitted light beam 103, reaches the isolation unit 12 via the optical system 6, the lenses 4 and 5, and the scanning unit 3 and passes through the transmissive portion 41 of the isolation unit 12. The emitted light that has passed through the transmissive portion 41 is incident on the detector 10 via the lenses 8 and 9 and is detected by the detector 10.

As described above, the emitted light emitted at a position in the sample 7, the position being different from the position of the spot of the irradiation light beam 101 in the sample 7, reaches the isolation unit 12 via the optical system 6, the lenses 4 and 5, and the scanning unit 3 and passes through the isolation unit 12. In other words, the isolation unit 12 according to the second embodiment is configured to isolate the optical path of the irradiation light beam 101 and the optical path of the emitted light from each other by enabling the emitted light, which is emitted at a position different from the position of the spot of the irradiation light beam 101 in the sample 7, to pass therethrough. Thus, the isolation unit 12 is disposed at a position that is not conjugated with the entrance pupil of the optical system 6.

Similar to the reflective portion 22 according to the first embodiment, the reflective portion 42 is formed by providing a reflecting member at a center portion of a flat plate in such a manner as to reflect light having a wavelength the same as that of the irradiation light beam 101. It is desirable that the transmissive portion 41 be provided with an anti-reflection coating film in order to efficiently detect the emitted light.

The isolation unit 12 does not need to include a member that serves as the transmissive portion 41, and the emitted light may propagate in a space such as air. In this case, the space is considered as the transmissive portion 41. In the case where the irradiation light beam 101 is polarized, the reflective portion 42 may be formed by using a polarizing element that reflects the polarized irradiation light beam 101 and enables light polarized perpendicularly to the polarized irradiation light beam 101 to pass therethrough. In this case, in addition to the transmissive portion 41, the reflective portion 42 can also enable some of the emitted light to pass therethrough, and thus, detection of the emitted light can be further efficiently performed.

Although the shape of the transmissive portion 41 of the isolation unit 12 is circular in FIG. 4, the shape of the transmissive portion 41 may be any shape as long as the transmissive portion 41 covers a region in which scattered light spreads. For example, the shape of the transmissive portion 41 may be elliptical having a long axis extending in a direction in which the transmissive portion 41 enables the scattered light to pass therethrough.

When the irradiation light beam 101 is incident on the isolation unit 12 in a direction normal to a plane, the size of the reflective portion 42 in the plane is set to be equal to or larger than the beam diameter of the irradiation light beam 101. In the case where this condition is not satisfied, there is a possibility that the irradiation light beam 101 will not be completely reflected by the isolation unit 12 and that the intensity of the irradiation light beam 101 will be reduced. In addition, in the case where the irradiation light beam 101 is radiated onto the sample 7 while some of the irradiation light beam 101 is not reflected by the isolation unit 12, the spot of the irradiation light beam 101 condensed to the sample 7 becomes larger, and consequently, there is a possibility that the spatial resolution of an image obtained by the microscope 300 will be less than ideal.

Also in the second embodiment, the scanning unit 3 and the detector 10 are arranged in such a manner that the scanning unit 3 and the light-receiving surface of the detector 10 are conjugated with each other.

As described above, in the microscope 300, the isolation unit 12 is disposed in the optical path of the irradiation light beam 101 between the light source 1 and the scanning unit 3. When the irradiation light beam 101 is radiated onto the sample 7, scattered light and the like generated at the spot in the sample 7 are multiply-scattered and are emitted as the emitted light from the sample 7. Since the isolation unit 12 is configured to reflect the irradiation light beam 101 and enable the emitted light to pass therethrough, by using the isolation unit 2, the optical path of the irradiation light beam 101 and the optical path of the emitted light can be isolated from each other, and the emitted light can be obtained. Since the isolation unit 12 isolates the optical paths from each other without using a dichroic mirror, the emitted light having a wavelength the same as the wavelength of the irradiation light beam 101, as well as fluorescent light and harmonic generation light, can be detected. In addition, a larger portion of the emitted light, which has reached the isolation unit 12, can be guided to the detector 10 compared with the configuration in which the optical paths are isolated from each other by polarization. Therefore, according to the microscope 300 of the second embodiment, the emitted light emitted from the sample 7 can be detected with higher efficiency than in the related art.

Third Embodiment

Figure 5:
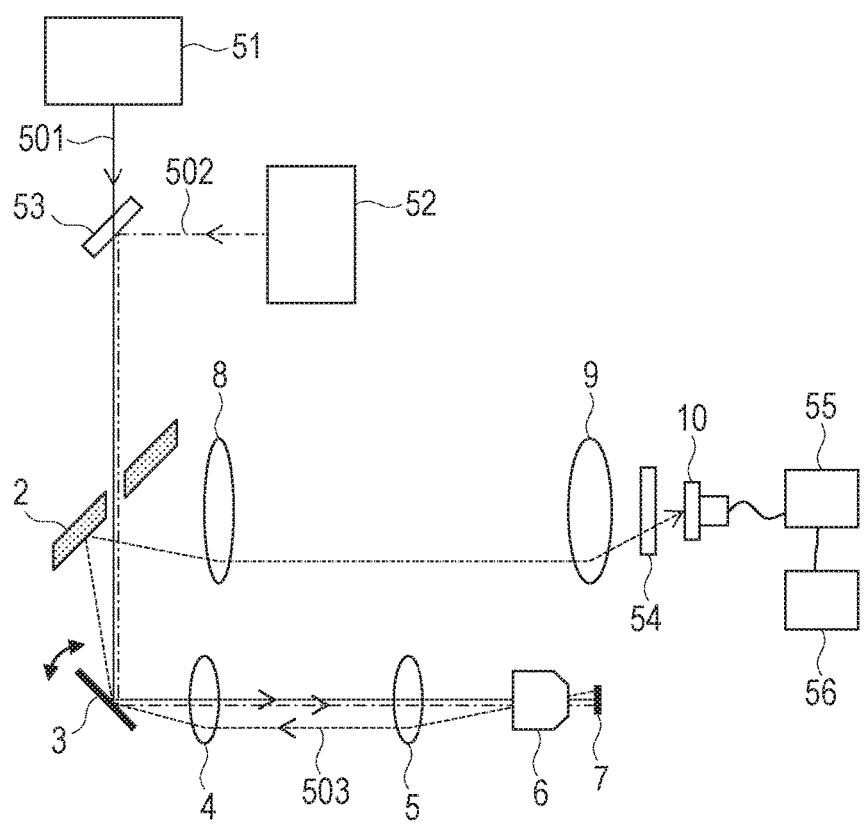
FIG. 5 is a schematic diagram illustrating the configuration of a scanning microscope according to a third embodiment.

A scanning microscope 500 (hereinafter referred to as microscope 500) according to a third embodiment will now be described with reference to FIG. 5. FIG. 5 is a schematic diagram illustrating the configuration of the microscope 500. The microscope 500 according to the third embodiment is a stimulated Raman scattering (SRS) microscope.

By using coherent Raman scattering (CRS), a three-dimensional distribution of molecular species in a living body and body composition can be observed. By using SRS, which is one type of CRS, quantitative observation can be performed without spectral distortion. SRS is a non-linear optical process and occurs proportionally to the product of the intensities of two light components having different wavelengths.

In order to efficiently induce SRS, two light pulses (irradiation light beams) 501 and 502 of different wavelengths that are respectively emitted by two light sources 51 and 52 are converged onto the same focal point (spot) in the sample 7, and these two light pulses 501 and 502 are simultaneously radiated onto the sample 7. When the difference between the optical frequencies of the two light pulses 501 and 502 is equal to the natural frequency of the molecules of the sample 7, SRS occurs at the spot. As a result, among the two irradiation light beams 501 and 502, which have passed through the sample 7, the intensity of an light pulse (pump light) having a short wavelength decreases (stimulated Raman loss), and the intensity of an light pulse (Stokes light) having a long wavelength increases (stimulated Raman gain). In order to efficiently induce SRS, it is desirable to use a short-pulse laser whose pulse time width is 1 to 10 picoseconds.

The difference between the microscope 500 and the microscope 100 according to the first embodiment is that the microscope 500 includes the two light sources, which are the first light source 51 and the second light source 52, a multiplexing portion 53, and an optical bandpass portion 54, and the rest of the configuration of the microscope 500 is similar to that of the microscope 100. Components similar to those in the first embodiment are denoted by the same reference numerals, and detailed description hereof will be omitted.

The first light source 51 outputs first light pulses (first irradiation light beam, pump light) 501 having a wavelength $\lambda 1$. The second light source 52 outputs second light pulses (second irradiation light beam, Stokes light) 502 having a wavelength $\lambda 2$, which is longer than the wavelength $\lambda 1$. More specifically, the first light source 51 is a solid-state laser (titanium-sapphire laser) that outputs light pulses having a central wavelength of 800 nanometers and a pulse period of 12.5 nanoseconds. For example, the Mai Tar manufactured by Spectra-Physics, Inc. can be used. The second light source 52 is an ytterbium-doped fiber laser that outputs light pulses having a central wavelength of 1,030 nanometers and a pulse period of 25 nanoseconds.

Figure 6A:
FIG. 6A is a time profile of light intensities of first light pulses in the scanning microscope according to the third embodiment.
Figure 6B:
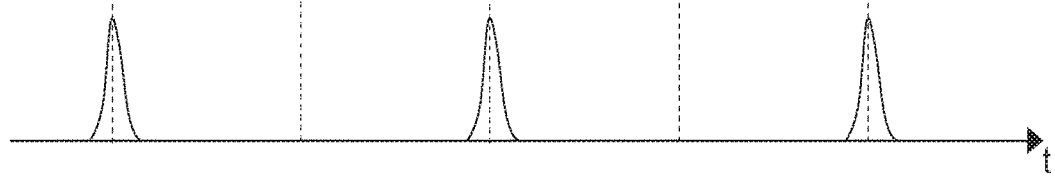
FIG. 6B is a time profile of light intensities of second light pulses in the scanning microscope according to the third embodiment.

FIG. 6A illustrates a pulse sequence at a focal point of the first irradiation light beam 501, which is emitted by the first light source 51, in the sample 7, and FIG. 6B illustrates a pulse sequence at a focal point of the second irradiation light beam 502, which is emitted by the second light source 52, in the sample 7. In FIG. 6A and FIG. 6B, the X-axis denotes time (t), and the Y-axis denotes light intensity.

In order to detect scattered light generated as a result of SRS, the ratio of the repetition period of the light pulse sequence of the first irradiation light beam 501 to the repetition period of the light pulse sequence of the second irradiation light beam 502 is set to 1:2. In order to set the ratio of these repetition periods to 1:2 and to simultaneously radiate the irradiation light beams 501 and 502 having the two different wavelengths onto the sample 7, for example, the first light source 51 or the second light source 52 may be formed as a mode-locked laser, and its cavity length may be controlled. By changing the cavity length, the repetition periods are changed, and the timing at which the light pulses are radiated onto the sample 7 can be adjusted.

As illustrated in FIG. 6A and FIG. 6B, when the two irradiation light beams 501 and 502 having different wavelengths are converged onto the same point in the sample 7 at the same timing, modulation of the light intensity of the first irradiation light beam 501 occurs in accordance with the difference between the wavelengths as a result of SRS. In other words, the intensities of pulses 31, 33, 35 in FIG. 6A decrease, and the intensities of pulses 32 and 34 do not change. This intensity modulation occurs not only in the light that has passed through the sample 7 but also in light that has been multiply-scattered and that has been emitted in the direction in which the irradiation light beams 501 and 502 have been radiated to the sample 7. The difference in intensity between the adjacent pulses is very small, and thus, the difference is measured by using a synchronous detection unit, such as a lock-in amplifier.

The degree of the intensity modulation, which is measured, corresponds to an SRS signal, and information regarding molecules included in a focal point of a laser beam is reflected. For example, when the resonant frequency of molecular vibration included in the focal point and the difference in optical frequency ($c/\lambda 1 - c/\lambda 2$) between the two irradiation light beams 501 and 502 are equal to each other, the SRS signal is increased. Note that the term c refers to light velocity. By obtaining the SRS signal while varying the difference in optical frequency ($c/\lambda 1 - c/\lambda 2$) between the two irradiation light beams 501 and 502, a Raman spectrum can be obtained. In order to obtain a Raman spectrum, at least one of the wavelengths of the two irradiation light beams 501 and 502 is varied. The molecular species included in the sample 7 can be estimated from the Raman spectrum. In addition, the SRS microscope 500 can obtain a spectrum equivalent to that obtained by a microscope using spontaneous Raman scattering. Since the scattering efficiency of SRS is significantly larger than the scattering efficiency of spontaneous Raman scattering, the SRS microscope 500 can obtain a Raman spectrum in a shorter time than that in the case where a microscope using spontaneous Raman scattering is employed.

The first irradiation light beam 501 and the second irradiation light beam 502 are multiplexed so as to be coaxial with each other by a dichroic mirror serving as the multiplexing portion 53 and then are reflected by the scanning unit 3. Similar to the first embodiment, the scanning unit 3 includes, for example, a galvanometer scanner and a resonant scanner and causes the first irradiation light beam 501 and the second irradiation light beam 502, which have traveled in one direction, to travel in two directions that are perpendicular to each other. By using a resonant scanner (scan frequency of 8 kHz) and a galvanometer scanner (scan frequency of 15 Hz), an image of 500 lines can be obtained at 30 frames per second.

The first irradiation light beam 501 and the second irradiation light beam 502, which have been deflected by the scanning unit 3, are incident on the optical system 6 via the lenses 4 and 5. In this case, by arranging the lenses 4 and 5 in such a manner that the scanning unit 3 and the entrance pupil of the optical system 6 are substantially conjugated with each other, even when the first irradiation light beam 501 and the second irradiation light beam 502 are deflected by the scanning unit 3, the first irradiation light beam 501 and the second irradiation light beam 502 are converged onto the sample 7 without a change in their light amounts as a result of being blocked.

The magnification of the optical system 6 that is set by the lenses 4 and 5 is selected in such a manner that the entrance pupil of the optical system 6 is equal to the size of the first irradiation light beam 501 and the size of the second irradiation ht beam 502. In this case, the spot size of the first and second irradiation light beams 501 and 502 converged by the optical system 6 canal be minimized, and the spatial resolution with which the SRS signal is detected can be improved. In addition, the SRS signal is increased as a result of the light intensity being increased by light convergence, and thus, the signal-to-noise (SN) ratio with which the SRS signal is detected is also improved. It is desirable that the numerical aperture (NA) of the optical system 6 be large from the standpoint of the spatial resolution and the SN ratio with which the SRS signal is detected.

The sample 7 is disposed so as to be sandwiched between two cover glasses (not illustrated) or two slide glasses (not illustrated). As a result of the first irradiation light beam 501 and the second irradiation light beam 502 being deflected by the scanning unit 3, the first irradiation light beam 501 and the second irradiation light beam 502 are converged onto a spot on the sample 7, and the spot is caused to two-dimensionally scan the sample 7. In this manner, an SRS signal is obtained by detecting emitted light beams emitted at positions on the sample 7, and as a result, the SRS signal is converted into a two-dimensional image. Since the SRS signal is generated only in the vicinity of the spot of the converged first and irradiation light beams 501 and 502, a three-dimensional information can be obtained by causing the sample 7 to be displaced in an optical axis direction by using a translation stage (not illustrated).

The light intensity of the light pulse sequence included in the first irradiation light beam 501 is modulated in accordance with the difference in wavelength between the first irradiation light beam 501 and the second irradiation light beam 502 as a result of SRS. The light pulse sequence of the first irradiation light beam 501 and the light pulse sequence of the second irradiation light beam 502 are multiply-scattered in the sample 7 and are incident on the optical system 6 again from positions different from the position of the spot in the sample 7. After the emitted light has been reflected by the scanning unit 3, the emitted light is reflected by the isolation unit 2 and is guided to the detector 10 via the lenses 8 and 9.

The optical bandpass portion 54 is disposed immediately in front of the detector 10. The optical bandpass portion 54 is a filter that extracts light having a specific wavelength range. More specifically, a band-pass filter, a short pass filter, or the like can be used as the optical bandpass portion 54. In the third embodiment, among the emitted light incident on the optical bandpass portion 54, light having the wavelength $\lambda 2$ is cut, and light having the wavelength $\lambda 1$ is extracted and is incident on the detector 10 so as to be detected by the detector 10. As a result, among the emitted light incident on the optical bandpass portion 54, the emitted light having a wavelength the same as the wavelength of the first irradiation light beam 501, whose light intensity has been modulated as a result of SRS, is incident on the detector 10 and is detected by the detector 10.

It is desirable that the scanning unit 3 and the detector 10 be arranged in such a manner that the scanning unit 3 and the light-receiving surface of the detector 10 are conjugated with each other. By arranging the scanning unit 3 and the detector 10 in such a manner that the scanning unit 3 and the light-receiving surface of the detector 10 are conjugated with each other, the position of the emitted light that is radiated onto the light-receiving surface of the detector 10 becomes constant regardless of the angle at which the scanning unit 3 deflects light. Therefore, the probability of the emitted light being radiated onto a region outside the light-receiving surface can be reduced, and detection of the emitted light can be performed while the influence of unevenness in the light-receiving sensitivity in the light-receiving surface is reduced.

A computer 56 acquires data regarding a two-dimensional image corresponding to an SRS signal of the sample 7 by using a control signal of the scanning unit 3 and an output signal (SRS signal) of a signal-acquisition circuit 55 and causes the display section (not illustrated) to display the two-dimensional image. The computer 56 can also acquire three-dimensional image data from the SRS signal obtained by causing the sample 7 to be displaced in the optical axis direction of the optical system 6 by using the stage (not illustrated). In addition, the computer 56 can obtain a Raman spectrum by using an SRS signal obtained by varying at least one of the wavelengths of the first light source 51 and the second light source 52.

Regarding the optical path of the emitted light in the separation unit 2, the optical path of an emitted light beam 503, which is one of a plurality of light beams included in the emitted light incident on the optical system 6 again from various positions in the sample 7, will now be described as an example. The emitted light beam 503, which has been emitted at a position different from the spot of the converged irradiation light beams and that has been incident on the optical system 6 again, is emitted at an angle different from the angles of incidence of the first irradiation light beam 501 and the second irradiation light beam 502 at the position of the pupil of the optical system 6.

Since the optical system 6 and the scanning unit 3 are disposed in such a manner that the position of the pupil of the optical system 6 and the scanning unit 3 are conjugated with each other, the emitted light beam 503 is emitted from the scanning unit 3 at an angle different from the angles of incidence of the first irradiation light beam 501 and the second irradiation light beam 502. Thus, the emitted light beam 503 is reflected by the separation unit 2 which is disposed in such a manner as to be spaced apart from the scanning unit 3. In this manner, the optical paths of the first irradiation light beam 501 and the second irradiation light beam 502, which are radiated onto the sample 7, and the optical path of the emitted light beam 503 can be isolated from each other.

The required external size of the separation unit 2 will now be examined by taking as an example the emitted light beam 503 generated at a position spaced apart from a focal spot by 0.1 mm when the focal lengths of the optical system 6, the lens 4, and the lens 5 are respectively set to 3 mm, 100 mm, and 200 mm. The angle of incidence and the angle of emission of the emitted light beam 503 with respect to the scanning unit 3 are different from the angles of incidence and the angles of emission of the first irradiation light beam 501 and the second irradiation light beam 502 with respect to the scanning unit 3 by about 0.067 radians (0.1/3×200/100). A case where the separation unit 2 is spaced apart from the scanning unit 3 by 200 mm and is disposed so as to be inclined at 45 degrees with respect to the first irradiation light beam 501 and the second irradiation light beam 502 will now be described. In this case, the emitted light beam 503 passes a position that is spaced apart from the center of the separation unit 2 by about 13.4 mm (0.067×200) in the short-axis direction and by about 19 mm. (0.067×200×√2) in the long-axis direction. Accordingly, when the external size of the separation unit 2 is set to be a diameter of 38 mm or larger, the optical paths of the first irradiation light beam 501 and the second irradiation light beam 502 and the optical path of the emitted light beam 503 can be isolated from each other, and the emitted light beam 503 can be detected. The angle at which the separation unit 2 is disposed is not limited to 45 degrees and may be close to 90 degrees. In this case, the external size of the separation unit 2 can be further reduced.

Next, the size of the transmissive portion 21 of the separation unit 2 will be examined. When the size of the pupil of the optical system 6 is set to 7 mm, the size of a conjugate image of the pupil of the optical system 6 on the scanning unit 3 is 3.5 mm. Since a beam having a diameter of 3.5 mm larger does not pass through the optical system 6 on the scanning unit 3, it is not necessary to set the size of the transmissive portion 21 when viewed from the direction of incidence of the first irradiation light beam 501 and the second irradiation light beam 502 to be larger than 3.5 mm. Therefore, when the beam size of each of the first irradiation light beam 501 and the second irradiation light beam 502 is 3 mm, it is desirable that the size of the transmissive portion 21 when viewed from the direction of incidence of the first irradiation light beam 501 and the second irradiation light beam 502 be set to 3.0 mm or larger and 3.5 or smaller.

In the case where the separation unit 2 is disposed in such a manner as to be inclined at 45 degrees with respect to the first irradiation light beam 501 and the second irradiation light beam 502, when the separation unit 2 is viewed from the front, the transmissive portion 21 has an elliptical shape whose length in the short-axis direction (the vertical direction as viewed in FIG. 5) is 3.0 mm or larger and 3.5 mm or smaller and whose length in the long-axis direction is √2 times larger than its length in the short-axis direction.

Next, the emitted light beam 503 in the case where the distance between a focal spot and a position where the emitted light is emitted is 0.01 mm, which is smaller than the above-mentioned 0.1 mm will be examined. In this case, the angle of incidence and the angle of emission of the emitted light beam 503 with respect to the scanning unit 3 are different from the angles of incidence and the angles of emission of the first irradiation light beam 501 and the second irradiation light beam 502 with respect to the scanning unit 3 by about 0.0067 radians (0.01/3×200/100). A case where the separation unit 2 is spaced apart from the scanning unit 3 by 200 mm and is disposed so as to be inclined at 45 degrees with respect to the first irradiation light beam 501 and the second irradiation light beam 502 will now be described. In this case, the emitted light beam 503 passes a position that is spaced apart from the center of the separation unit 2 by about 1.34 mm (0.0067×200) in the short-axis direction and by about 1.9 mm (0.0067×200×√2) in the long-axis direction. Accordingly, the emitted light beam 503 passes through the transmissive portion 21 and cannot be detected by the detector 10.

In such a case, the size of the transmissive portion 21 may be reduced, or the separation unit 2 may be disposed at a position spaced more apart from the scanning unit 3. In the case where the size of the transmissive portion 21 is reduced, the size of the spot in the sample 7 becomes large, and there is a possibility that the spatial resolution with which an SRS signal is detected will be reduced. Thus, the separation unit 2 may be positioned further spaced apart from the scanning unit 3. On the other hand, the farther from the scanning unit 3 the isolation unit 2 is positioned, the larger the reflective portion 22 needs to be in order to reflect the emitted light generated in a region in the sample 7. Therefore, in order to increase the efficiency with which the emitted light is obtained, the isolation unit 2 may be disposed at a position far from the scanning unit 3, and the external size of the isolation unit 2 may be set to be large so as to be proportional to the distance between the isolation unit 2 and the scanning unit 3.

Note that the present invention is not limited to the configuration in which the separation unit 2 is used as in the third embodiment, and the separation unit 12 can be used as in the second embodiment.

According to the microscope 500 of the third embodiment, even in the configuration in which the two light sources 51 and 52 are used, the optical paths of the first irradiation light beam 501 and the second irradiation light beam 502 and the optical path of the emitted light can be isolated from each other by the separation unit 2. According to the microscope 500 of the third embodiment, even in the case where the wavelength of the emitted light and the wavelength of the irradiation light 101 are the same as each other, their optical paths can be isolated from each other. In addition, a larger portion of the emitted light, which has reached the isolation unit 2, can be guided to the detector 10 compared with the configuration in which the optical paths are isolated from each other by polarization. Therefore, according to the microscope 500 of the third embodiment, the emitted light emitted from the sample 7 can be detected with higher efficiency than in the related art.

Although isolating the optical paths from each other at the position of the pupil of the optical system 6 may be considered as a method different from that according to the third embodiment, the optical paths can be more efficiently isolated from each other by using the method according to the third embodiment. This is because, since emitted light beams are not concentrated at a certain angle due to multiple scattering, the optical paths cannot be efficiently isolated from each other in a certain region on the pupil. In addition, from the standpoint of light use efficiency, in the third embodiment, the irradiation light can be radiated onto the sample 7 without being blocked.

Note that the emitted light detected by the detector 10 according to the third embodiment may be Stokes light or pump light. In addition, the device may be configured to measure a coherent anti-stokes Raman scattering (CARS) signal instead of an SRS signal. For example, a CARS signal can be detected by changing the optical bandpass portion 54 to a filter that enables only light in the wavelength band of the CARS signal to pass therethrough. In this case, a photomultiplier tube may be used as the detector 10.

Although the embodiments of the present invention have been described above, the present invention is not limited to the embodiments, and various modifications and changes may be made within the gist of the present invention.

For example, in the above-described embodiments, although a mirror having a flat plate-like shape is used as each of the separation units 2 and 12, a mirror having a curved surface can be used. In the case where a mirror having a curved surface is used, the curved surface and the lenses 8 and 9 are designed in such a manner that the scanning unit 3 and the light-receiving surface of the detector 10 are conjugated with each other.

In the above-described embodiments, two-dimensional scanning of the inside of the sample 7 (as well as the surface of the sample 7) is performed by using the scanning unit 3. However, the method for performing scanning of the sample 7 is not limited to this, and two-dimensional scanning may be performed by combining scanning performed by using an uniaxial galvanometer mirror and driving of the stage (not illustrated) that supports the sample 7 in a direction perpendicular to the direction in which the scanning using the galvanometer mirror is performed. In addition, the stage (not illustrated) may be driven in a two-dimensional plane. Furthermore, when it is not necessary to obtain an image of the sample 7, only one point in the sample 7 may be observed without causing, by using the scanning unit 3, the focal spot to scan the sample 7.

The method of detecting the emitted light by using the detector 10 is not limited to a method of performing lock-in detection by using a light source whose repetition frequency is n:m (n and m are integers) without using a modulator, and a lock-in detection method using an intensity modulator may be employed.

The above-described embodiments are not limited to being applied to measurement of CRS, a multiphoton microscope having one light source, and the like and may also be applied to a microscope that has a plurality of light sources and that measures multiphoton absorption and multiphoton fluorescence, and the like. In addition, in the above-described embodiments, although the configuration has been described in which the emitted light emitted from the sample 7 is measured, an endoscope, which is an embodiment of a microscope, may be formed by implementing a configuration for radiating light onto the sample 7 into a probe.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application. No. 2015-235241, filed Dec. 1, 2015, which is hereby incorporated by reference herein in its entirety.

What is claimed is:

1. A scanning microscope comprising:
a scanning unit that causes a first irradiation light beam from a first light source to scan a sample;
a first optical system that guides the first irradiation light beam that has passed through the scanning unit to the sample, and guides an emitted light from the sample to the scanning unit;
a second optical system that guides the first irradiation light beam from the scanning unit to the first optical system;
an isolation unit disposed in an optical path of the first irradiation light beam between the first light source and the scanning unit, the isolation unit including a reflective portion that reflects at least some of the emitted light or the first irradiation light beam and a transmissive portion through which the first irradiation light beam or at least some of the emitted light passes,
wherein the reflective portion is formed at a position different from a position of the transmissive portion;
a detection unit that detects the emitted light via the isolation unit;
a third optical system that guides the emitted light via the isolation unit to a light-receiving surface of the detection unit; and
a multiplexing portion that multiplexes the first irradiation light beam and a second irradiation light beam having a wavelength different from a wavelength of the first irradiation light beam, the second irradiation light beam being emitted from a second light source,
wherein the first optical system condenses the first irradiation light beam and the second irradiation light beam multiplexed by the multiplexing portion to the sample such that the sample emits the emitted light,
wherein the second optical system is disposed such that the scanning unit and an entrance pupil of the first optical system are conjugated with each other,
wherein the third optical system is disposed such that the scanning unit and the light-receiving surface of the detection unit are conjugated with each other, and
wherein the isolation unit is disposed on the optical path at a position farther from the entrance pupil of the first optical system than the scanning unit.

2. The scanning microscope according to claim 1,
wherein the isolation unit is configured to enable the emitted light emitted at a position different from a focal point of the first irradiation light beam in the sample to pass.

3. The scanning microscope according to claim 1,
wherein the reflective portion has a size that is not smaller than a beam diameter of the first irradiation light beam.

4. The scanning microscope according to claim 1, further comprising:
a filter that is disposed between the isolation unit and the detection unit and that extracts light having the wavelength of the first irradiation light beam from the emitted light,
wherein the isolation unit is disposed in an optical path of the first irradiation light beam between the multiplexing portion and the first optical system.

5. The scanning microscope according to claim 1,
wherein the first irradiation light beam passes through the transmissive portion and the reflective portion reflects at least some of the emitted light that passed through the first optical system and the second optical system.

6. The scanning microscope according to claim 1,
wherein the isolation unit includes the reflective portion that reflects the first irradiation light beam and the transmissive portion through which at least some of the emitted light that passed through the first optical system and the second optical system passes.

7. A scanning microscope comprising:
a first light source that emits a first irradiation light beam;
a second light source that emits a second irradiation light beam, whose wavelength is different from that of the first irradiation light beam;
a scanning unit that causes the first irradiation light beam from the first light source to scan a sample;
a first optical system that guides the first irradiation light beam that has passed through the scanning unit to the sample, and guides emitted light from the sample to the scanning unit;
a second optical system that guides the first irradiation light beam from the scanning unit to the first optical system;
an isolation unit disposed in an optical path of the first irradiation light beam between the first light source and the scanning unit, the isolation unit including a reflective portion that reflects at least some of the emitted light or the first irradiation light beam and a transmissive portion through which the first irradiation light beam or at least some of the emitted light passes,
wherein the reflective portion is formed at a position different from a position of the transmissive portion;
a detection unit that detects the emitted light via the isolation unit;
a third optical system that guides the emitted light via the isolation unit to a light-receiving surface of the detection unit; and
a multiplexing portion that multiplexes the first irradiation light beam and the second irradiation light beam,
wherein the first optical system condenses the first irradiation light beam and the second irradiation light beam multiplexed by the multiplexing portion to the sample,
wherein the second optical system is disposed such that the scanning unit and an entrance pupil of the first optical system are conjugated with each other,
wherein the third optical system is disposed such that the scanning unit and the light-receiving surface of the detection unit are conjugated with each other, and
wherein the isolation unit is disposed on the optical path at a position farther from the entrance pupil of the first optical system than the scanning unit.

8. The scanning microscope according to claim 7, further comprising:
a filter that is disposed between the isolation unit and the detection unit and that extracts light having the wavelength of the first irradiation light beam from the emitted light,
wherein the isolation unit is disposed in an optical path of the first irradiation light beam between the multiplexing portion and the first optical system.

9. The scanning microscope according to claim 7,
wherein the first irradiation light beam passes through the transmissive portion and the reflective portion reflects at least some of the emitted light that passed through the first optical system and the second optical system.

10. The scanning microscope according to claim 7,
wherein the isolation unit includes the reflective portion that reflects the first irradiation light beam and the transmissive portion through which at least some of the emitted light that passed through the first optical system and the second optical system passes.

11. A scanning microscope comprising:
a scanning unit that causes a irradiation light beam from a light source to scan a sample;
a first optical system that guides the irradiation light beam that has passed through the scanning unit to the sample, and guides an emitted light from the sample to the scanning unit;
a second optical system that guides the irradiation light beam from the scanning unit to the first optical system;
an isolation unit disposed in an optical path of the irradiation light beam between the light source and the scanning unit, the isolation unit including a reflective portion that reflects at least some of the emitted light or the irradiation light beam and a transmissive portion through which the irradiation light beam or at least some of the emitted light passes,
wherein the reflective portion is formed at a position different from a position of the transmissive portion;
a detection unit that detects the emitted light via the isolation unit; and
a third optical system that guides the emitted light via the isolation unit to a light-receiving surface of the detection unit;
wherein the first optical system condenses the irradiation light beam to the sample,
wherein the second optical system is disposed such that the scanning unit and an entrance pupil of the first optical system are conjugated with each other,
wherein the third optical system is disposed such that the scanning unit and the light-receiving surface of the detection unit are conjugated with each other, and
wherein the isolation unit is disposed on the optical path at a position farther from the entrance pupil of the first optical system than the scanning unit.

12. The scanning microscope according to claim 11,
wherein the transmissive portion passes through the irradiation light beam and the reflective portion reflects at least some of the emitted light that passed through the first optical system and the second optical system.

13. The scanning microscope according to claim 11,
wherein the reflective portion reflects the irradiation light beam and the transmissive portion passes through at least some of the emitted light that passed through the first optical system and the second optical system.

14. The scanning microscope according to claim 11,
wherein the transmissive portion is configured to enable the emitted light emitted at a position different from a focal point of the irradiation light beam in the sample to pass through the isolation unit.

15. The scanning microscope according to claim 11,
wherein the reflective portion has a size that is not smaller than a beam diameter of the irradiation light beam.

16. The scanning microscope according to claim 11, further comprising:
wherein the emitted light is scattered light generated as a result of multiple scattering in the sample.

17. The scanning microscope according to claim 11, further comprising:
wherein the scanning unit includes two mirrors, and
wherein the entrance pupil of the first optical system is conjugated with a position on one of the two mirrors or an intermediate position between the two mirrors.

18. The scanning microscope according to claim 11, further comprising:
wherein the scanning unit includes two mirrors, and
wherein the light-receiving surface of the detection unit is conjugated with a position on one of the two mirrors or an intermediate position between the two mirrors.

* * * * *